United States Patent
Ji et al.

(10) Patent No.: US 11,284,402 B2
(45) Date of Patent: Mar. 22, 2022

(54) RESOURCE INDICATION METHOD AND APPARATUS AND COMMUNICATION SYSTEM

(71) Applicant: FUJITSU LIMITED, Kawasaki (JP)

(72) Inventors: Pengyu Ji, Beijing (CN); Jianming Wu, Kanagawa (JP); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 16/773,070

(22) Filed: Jan. 27, 2020

(65) Prior Publication Data

US 2020/0163088 A1 May 21, 2020

Related U.S. Application Data

(63) Continuation of application No. PCT/CN2017/111427, filed on Nov. 16, 2017.

(51) Int. Cl.
*H04W 72/04* (2009.01)
*H04L 1/16* (2006.01)

(52) U.S. Cl.
CPC ....... *H04W 72/0493* (2013.01); *H04L 1/1614* (2013.01); *H04W 72/042* (2013.01); *H04W 72/0453* (2013.01)

(58) Field of Classification Search
CPC ............. H04W 72/0493; H04W 72/04; H04W 72/0453; H04L 1/1614
See application file for complete search history.

(56) References Cited

U.S. PATENT DOCUMENTS

| 7,072,386 B1* | 7/2006 | Hasegawa | H04B 3/02 375/219 |
| 2008/0309571 A1* | 12/2008 | Diaz | H01Q 13/0275 343/785 |

(Continued)

FOREIGN PATENT DOCUMENTS

| CN | 103096488 A | 5/2013 |
| CN | 103701578 A | 4/2014 |

(Continued)

OTHER PUBLICATIONS

International Search Report issued by the State Intellectual Property Office of the P.R. China for corresponding International Patent Application No. PCT/CN2017/111427, dated Aug. 8, 2018, with an English translation.

*Primary Examiner* — Samina F Choudhry
(74) *Attorney, Agent, or Firm* — Myers Wolin, LLC

(57) ABSTRACT

A resource indication method and apparatus and a communication system. The method includes: determining indication information, the indication information is used to indicate a second uplink resource in a second uplink frequency resource segment; wherein, the second uplink frequency resource segment or the second downlink frequency resource segment includes a second downlink predetermined number of second downlink resource block groups; and transmitting the first indication information to the UE in a first downlink frequency resource segment; wherein, the first downlink frequency resource segment or the first uplink frequency resource segment to which the first downlink frequency resource segment corresponds includes a first predetermined number of first uplink resource block groups, the first predetermined number being unequal to the second predetermined number; and wherein, the first indication information is bitmap information, a bit number of the (Continued)

bitmap information is determined according to the first predetermined number.

19 Claims, 5 Drawing Sheets

(56) References Cited

U.S. PATENT DOCUMENTS

2011/0299496 A1   12/2011   Iwai et al.
2015/0289274 A1   10/2015   Papasakellariou et al.

FOREIGN PATENT DOCUMENTS

CN      107027183 A    8/2017
EP      2 757 849 A1   7/2014

* cited by examiner

FIG. 4

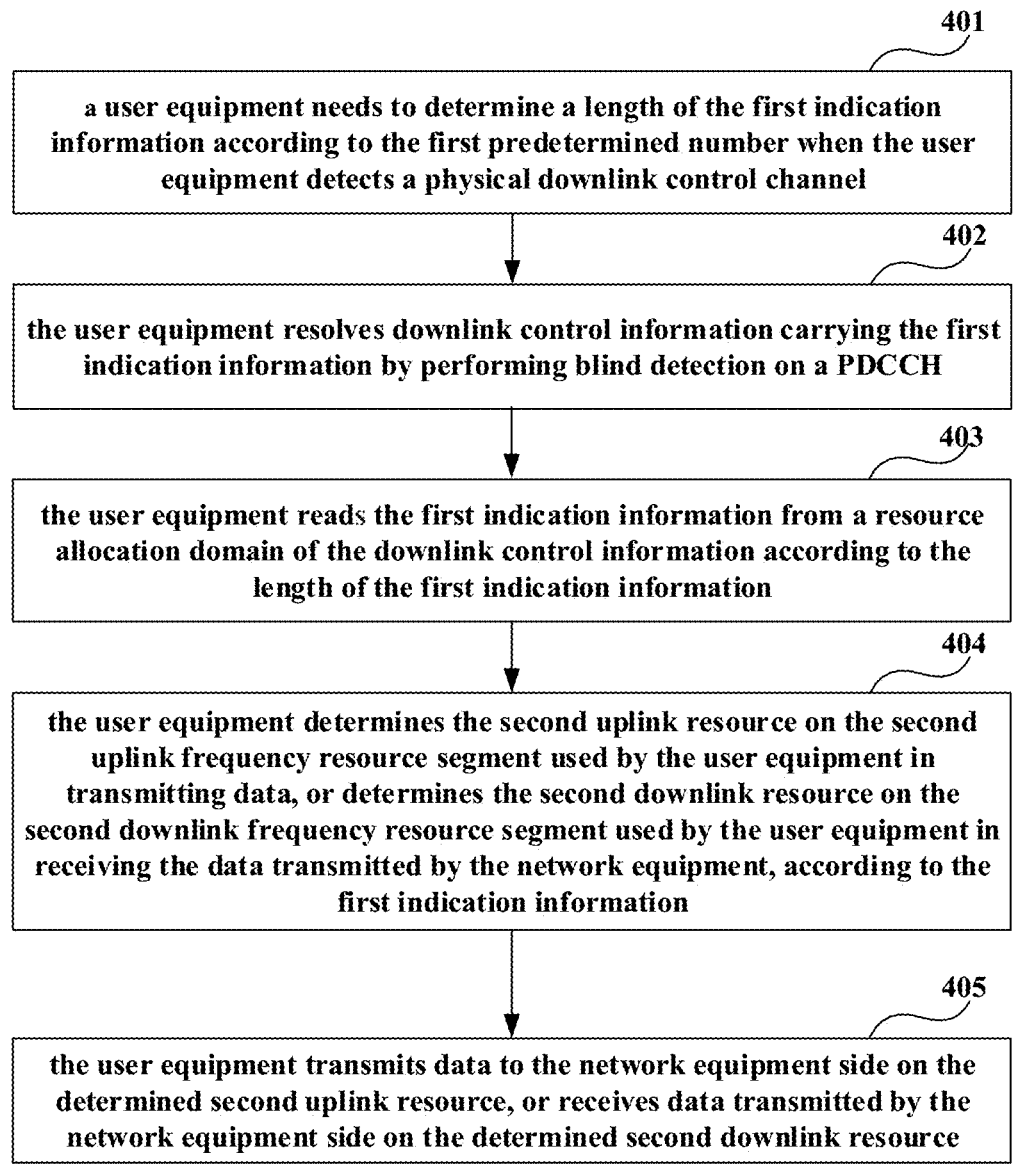

401 a user equipment needs to determine a length of the first indication information according to the first predetermined number when the user equipment detects a physical downlink control channel 402 the user equipment resolves downlink control information carrying the first indication information by performing blind detection on a PDCCH 403 the user equipment reads the first indication information from a resource allocation domain of the downlink control information according to the length of the first indication information 404 the user equipment determines the second uplink resource on the second uplink frequency resource segment used by the user equipment in transmitting data, or determines the second downlink resource on the second downlink frequency resource segment used by the user equipment in receiving the data transmitted by the network equipment, according to the first indication information 405 the user equipment transmits data to the network equipment side on the determined second uplink resource, or receives data transmitted by the network equipment side on the determined second downlink resource

FIG. 5

 Candidate resource block group

 Idle resource block group

RESOURCE INDICATION METHOD AND APPARATUS AND COMMUNICATION SYSTEM

CROSS REFERENCE TO RELATED APPLICATIONS

This application is a continuation application of International Application PCT/CN2017/111427 filed on Nov. 16, 2017, the entire contents of which are incorporated herein by reference.

FIELD

This disclosure relates to the field of communication technologies, and in particular to a resource indication method and apparatus and a communication system.

BACKGROUND

In a long term evolution (LTE) system, a resource indication mechanism is supported, which is defined as a downlink resource allocation type 0 in the downlink direction. A network equipment (such as a base station) indicates frequency domain resources allocated to a user equipment via bitmap contained in downlink control information (DCI) with a corresponding format. A smallest granularity for the allocated resources is a resource block group (RBG), and each bit in the bitmap indicates whether each corresponding RBG on the entire bandwidth is allocated to the user equipment, wherein a size of the RBG may be determined by the system bandwidth.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a 5th-generation (5G) mobile communication system, such as a new radio (NR) system, multiple uplink or downlink component carriers (CC) or bandwidth parts (BWP) may be simultaneously configured for a user equipment, and frequency domain resource allocation is performed within an activated CC or BWP configured for the user equipment; one or more CCs or BWPs is/are activated within a predetermined time, so that the user equipment performs data transceiving in the resources allocated in the activated uplink or downlink CCs or BWPs within the predetermined time.

Since multiple uplink and downlink CCs or BWPs are configured, it is possible to change between different CCs or BWPs according to actual data transmission requirements, or to perform cross-CC or cross-BWP scheduling. Since the number of bits contained in the bitmap information indicating the frequency domain resource allocated for the user equipment is related to the sizes of currently activated CCs or BWPs, when active CC or BWP change or cross-CC or BWP scheduling occurs, if the sizes of the currently activated CCs or BWPs are much different from sizes of target CCs or BWPs to be changed to or cross-CC or BWP scheduled, a problem that the number of bits of the bitmap information indicating the current resources does not match the number of RBGs of the target CCs or BWPs will be resulted.

For how to schedule target CCs or BWPs on current CCs or BWPs, it has been proposed to make lengths of bitmap information of resources allocated on the current CCs or BWPs and the target CCs or BWPs to be equal. However, this method will make that redundant information exists in bitmap information with shorter lengths, resulting in waste of control signaling resources.

Embodiments of this disclosure provide a resource indication method and apparatus and a communication system, which solve the problem that the number of bits of the bitmap information indicating the current resources does not match the number of RBGs of target CCs or BWPs, without needing extra overhead, avoiding waste of control signaling resources, while lowering complexity of blind decoding.

According to a first aspect of the embodiments of this disclosure, a resource indication method is provided, including:

determining first indication information, the first indication information is used to indicate a second uplink resource in a second uplink frequency resource segment used by user equipment (UE) for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups; and transmitting the first indication information to the UE in a first downlink frequency resource segment; wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

According to a second aspect of the embodiments of this disclosure, a resource indication apparatus is provided, including:

a first determining unit configured to determine first indication information, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups; and a first transmitting unit configured to transmit the first indication information to the UE in a first downlink frequency resource segment; wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

According to a third aspect of the embodiments of this disclosure, a resource indication method is provided, including:

receiving, from a first downlink frequency resource segment, first indication information transmitted by a network side, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups;

wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

According to a fourth aspect of the embodiments of this disclosure, a resource indication apparatus is provided, including:

a first receiving unit configured to receive, from a first downlink frequency resource segment, first indication information transmitted by a network side, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups;

wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

According to a fifth aspect of the embodiments of this disclosure, there is provided a communication system, including:

a network equipment, including the resource indication apparatus as described in the second aspect; and a user equipment, including the resource indication apparatus as described in the fourth aspect.

An advantage of the embodiments of this disclosure exists in that the second number of the resource block groups of the target CCs or BWPs to be changed to or cross-CC or BWP scheduled is different from the first number of the resource block groups of the currently activated CCs or BWPs, and the indication information indicating the resources on the target CCs or BWPs is determined according to the first number, which solve the problem that the number of bits of the bitmap information indicating the current resources does not match the number of RBGs of target CCs or BWPs, without needing extra overhead, avoiding waste of control signaling resources, while lowering complexity of blink detection.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 4 is a schematic diagram of the resource indication method of Embodiment 3;

FIG. 5 is a schematic diagram of a predetermined position of Embodiment 3;

DETAILED DESCRIPTION

Figure 1:
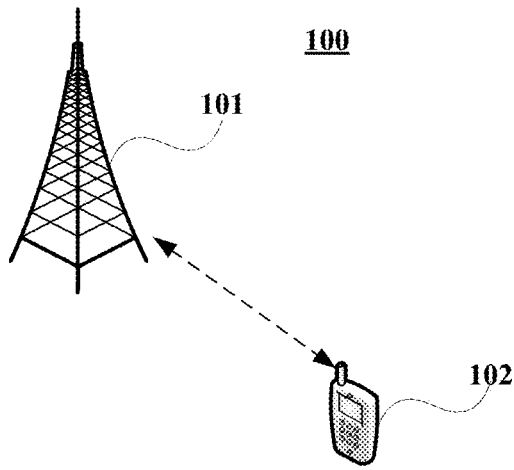
FIG. 1 is a schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G 2.5G 2.75G 3G 4G 4.5G and 5G and new radio (NR) in the future, etc., and/or other communication protocols that are currently known or will be developed in the future.

In the embodiments of this disclosure, the term "network equipment", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network equipment are taken as examples is schematically shown. As shown in FIG. 1, the communication system 100 may include a network equipment 101 and a user equipment 102. For the sake of simplicity, description is given in FIG. 1 by taking only one user equipment and one terminal equipment as an example; however, the embodiments of this disclosure are not limited thereto.

In the embodiment of this disclosure, existing traffics or traffics that may be implemented in the future may be performed between the network equipment 101 and the user equipment 102. For example, such traffics may include but not limited to an enhanced mobile broadband (eMBB), massive machine type communication (MTC), and ultra-reliable and low-latency communication (URLLC), etc.

The embodiments of this disclosure shall be described below by taking an NR system as an example. However, this disclosure is not limited thereto, and it is also applicable to any systems where similar problems exist.

Embodiment 1

The embodiment of this disclosure provides a resource indication method, applicable to a network equipment side.

Figure 2:
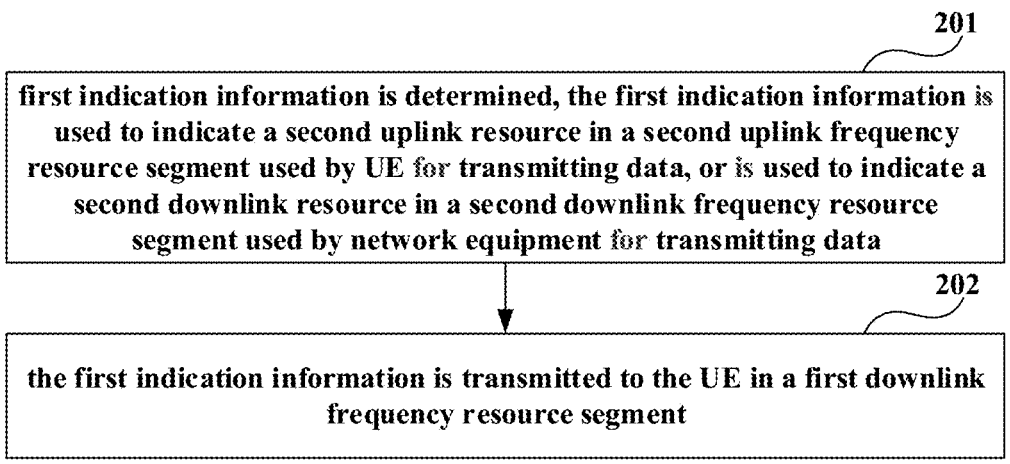
FIG. 2 is a schematic diagram of the resource indication method of Embodiment 1.

FIG. 2 is a schematic diagram of the resource indication method of this embodiment, which shall be described from a network equipment side. As shown in FIG. 2, the method includes:

step 201: first indication information is determined, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups; and step 202: the first indication information is transmitted to the UE in a first downlink frequency resource segment; wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

In this embodiment, the frequency resource segment indicates a frequency range occupied by resources in the frequency domain, and frequencies in the frequency range may be continuous or discontinuous, and the frequency resource segment includes a predetermined number of resource blocks (RBs), and a size of the frequency resource segment may be denoted by the number of RBs; wherein for the same segment of frequency resources, it may be used for uplink or downlink, that is, the frequency resource segment may be an uplink frequency resource segment or a downlink frequency resource segment. Frequency ranges of the uplink frequency resource segment and the downlink frequency resource segment correspond may be identical or different, and this embodiment is not limited thereto. For example, the frequency resource segment may be a CC or a BWP, or a set of multiple CCs or BWPs.

In this embodiment, for the convenience of description, the first uplink frequency resource segment and the first downlink frequency resource segment are collectively referred to as a first frequency resource segment, and the second uplink frequency resource segment and the second downlink frequency resource segment are collectively referred to as a second frequency resource segment, and when frequency resource segment (CC or BWP) changing or cross-frequency resource segment (CC or BWP) scheduling needs to be performed, the first frequency resource segment is a currently activated frequency resource segment, and the second frequency resource is a target frequency resource segment to be changed to or for cross-frequency resource segment scheduling; wherein, in performing uplink transmission, the first frequency resource segment is a first uplink frequency resource segment, and in performing downlink transmission, the first frequency resource segment is a first downlink frequency resource segment; wherein the first downlink frequency resource segment corresponding to the first uplink frequency resource segment indicates that the first downlink frequency resource segment or the first uplink frequency resource segment is the currently activated frequency resource segment (i.e. an originally scheduled frequency resource segment), and the second frequency resource segment may be a second downlink frequency resource segment used for downlink transmission (transmitting data by the network equipment to the user equipment) or a second uplink frequency resource segment used for uplink transmission (transmitting data by the user equipment to the network equipment); wherein the second downlink frequency resource segment or the second uplink frequency resource segment is the target frequency resource segment to be changed to (a frequency resource segment to be scheduled).

In this embodiment, the first frequency resource segment and the second frequency resource segment are configurable, which are configured by the network equipment for the user equipment according to capabilities of the user equipment. Therefore, both the network equipment and the user equipment can acquire sizes of the first frequency resource segment and the second frequency resource segment.

In this embodiment, the change of the frequency resource segment indicates that the frequency resource segment is changed from the first frequency resource segment to the second frequency resource segment, that is, the first frequency resource segment is deactivated, and the second frequency resource segment is activated; wherein when the second frequency resource segment is used for uplink transmission, the second frequency resource segment is the second uplink frequency resource segment, that is, in performing frequency resource segment changing, the user equipment is changed from the first uplink frequency resource segment to the second uplink frequency resource segment; and when the second frequency resource segment is used for downlink transmission, the second frequency resource segment is the second downlink frequency resource segment, that is, in performing frequency resource segment changing, the user equipment is changed from the first downlink frequency resource segment to which the first uplink frequency resource segment corresponds to the second downlink frequency resource segment.

In this embodiment, a minimum granularity of the frequency domain resource allocated by the network equipment (such as a base station) to the user equipment is a resource block group; wherein a minimum granularity of the frequency domain resource allocated on the first uplink frequency resource segment is referred to as a first resource block group, a minimum granularity of the frequency domain resource allocated on the first uplink frequency resource segment is referred to as a first uplink resource block group, a minimum granularity of the frequency domain resource allocated on the first downlink frequency resource segment is referred to as a first downlink resource block group, a minimum granularity of the frequency domain resource allocated on the second frequency resource segment is referred to as a second resource block group, a minimum granularity of the frequency domain resource allocated on the second uplink frequency resource segment is referred to as a second uplink resource block group, and a minimum granularity of the frequency domain resource allocated on the second downlink frequency resource segment is referred to as a second downlink resource block group; where sizes (the number of resource blocks contained in resource block groups) and numbers of the resource block groups to which the uplink and downlink frequency resource segments correspond may be identical or different.

In this embodiment, the size of the resource block group may be determined according to the size of the frequency resource segment and a correspondence between the size of the frequency resource segment and the size of the resource block group.

In this embodiment, the correspondence (such as a correspondence table) between the size of the frequency resource segment and the size of the resource block group may be pre-configured by the network equipment side, prestored at the network equipment side and the user equipment side, and then determined by looking up the table.

How the correspondence table is configured shall be illustrated below. For example, in the NR, a set of sizes of RBGs is {2, 4, 8, 16}, and particular values of RBGs of a frequency resource segment may be configured to be associated with a size of the frequency resource segment.

For example, Table 1 and Table 2 respectively show correspondences between sizes of frequency resource segments and sizes of RBGs corresponding to the frequency resource segments.

TABLE 1

Example of a correspondence between sizes of RBGs and sizes of frequency resource segments

| Sizes $N_{RB}^{UL/DL}$ of frequency resource segments | RBG Sizes (P) |
|---|---|
| ≤26 | 2 |
| 27-63 | 4 |
| 64-127 | 8 |
| 128-275 | 16 |

TABLE 2

Example of a correspondence between sizes of RBGs and sizes of frequency resource segments

| Sizes $N_{RB}^{UL/DL}$ of frequency resource segments | RBG Size (P) |
|---|---|
| ≤26 | 4 |
| 27-63 | 8 |
| 64-275 | 16 |

It should be noted that Table 1 and Table 2 only exemplarily show the correspondences between the sizes of the frequency resource segments and the sizes of the corresponding RBG However, this disclosure is not limited thereto, particular values may be appropriately adjusted according to actual situations, and other correspondence tables may be set.

In this embodiment, the size of the resource block group may also be pre-configured by the network side.

For example, the size of the resource block group of the frequency resource segment may be pre-configured for the frequency resource segment via higher-layer signaling (radio resource control (RRC) signaling); for example, when the network equipment configures a frequency resource segment of a size of 25 for the user equipment, RBG size=4 may be configured for the frequency resource segment via RRC signaling; when the network equipment configures a frequency resource segment of a size of 60 for the user equipment, RBG size=8 may be configured for the frequency resource segment via RRC signaling; and when the network equipment configures a frequency resource segment of a size of 250 for the user equipment, RBG size=16 may be configured for the frequency resource segment via RRC signaling. What described above is illustrative only, and this embodiment is not limited thereto.

In this embodiment, in performing uplink transmission, the second frequency resource segment is a second uplink frequency resource segment, which includes a second uplink predetermined number $N_2^{UL}$ of second uplink resource block groups; wherein, $N_2^{UL} = \lceil N_{RB2}^{UL}/P_2^U \rceil$; where, $N_{RB2}^{UL}$ denotes the number of resource blocks (RBs) contained in the second uplink frequency resource segment, and $P_2^U$ denotes the size of the second uplink resource block group; wherein, $N_{RB2}^{UL}$ may be pre-configured by the network side, and $P_2^U$ may be determined according to the above tables or may be pre-configured by the network side, which shall not be described herein any further; and in performing downlink transmission, the second frequency resource segment is a second downlink frequency resource segment, which includes a second downlink predetermined number $N_2^{DL}$ of second downlink resource block groups; wherein, $N_2^{DL} = \lceil N_{RB2}^{DL}/P_2^D \rceil$; where, $N_{RB2}^{DL}$ denotes the number of resource blocks (RBs) contained in the second uplink frequency resource segment, and $P_2^D$ denotes the size of the second downlink resource block group; wherein, $N_{RB2}^{DL}$ may be pre-configured by the network side, and $P_2^D$ may be determined according to the above tables or may be pre-configured by the network side, which shall not be described herein any further.

In this embodiment, in performing uplink transmission, the first frequency resource segment is a first uplink frequency resource segment, which includes a first uplink predetermined number $N_1^{UL}$ of first uplink resource block groups; wherein, $N_1^{UL} = \lceil N_{RB1}^{UL}/P_1^U \rceil$; where, $N_{RB1}^{UL}$ denotes the number of resource blocks (RBs) contained in the first uplink frequency resource segment, and $P_1^U$ denotes the size of a first uplink resource block group; wherein, $N_{RB1}^{UL}$ may be pre-configured by the network side, and $P_1^U$ may be determined according to the above tables or may be pre-configured by the network side, which shall not be described herein any further; and in performing downlink transmission, the first frequency resource segment is a first downlink frequency resource segment, which includes a first downlink predetermined number $N_1^{DL}$ of first downlink resource block groups; wherein, $N_1^{DL} = \lceil N_{RB1}^{DL}/P_1^D \rceil$; where, $N_{RB1}^{DL}$ denotes the number of resource blocks (RBs) contained in the first uplink frequency resource segment, and $P_1^D$ denotes the size of the first downlink resource block group; wherein, $N_{RB1}^{DL}$, may be pre-configured by the network side, and $P_1^D$ may be determined according to the above tables or may be pre-configured by the network side, which shall not be described herein any further.

In this embodiment, in performing uplink transmission, the second frequency resource segment is a second uplink frequency resource segment, which includes $N_2^{UL}$ second uplink resource block groups, and the first uplink frequency resource segment to which the first downlink frequency resource segment corresponds includes $N_2^{UL}$ first uplink resource block groups, $N_2^{UL} \neq N_1^{UL}$; and in performing downlink transmission, the second frequency resource segment is a second downlink frequency resource segment, which includes $N_2^{DL}$ second downlink resource block groups, and the first downlink frequency resource segment includes $N_1^{DL}$ first downlink resource block groups, $N_2^{DL} \neq N_1^{DL}$.

In step 201, the first indication information is determined, the first indication information being bitmap information. Because the first indication information is transmitted on the first downlink frequency resource segment, the number of bits of the bitmap information may be determined according to the first uplink predetermined number or the first downlink predetermined number. For example, the number of the bits of the bitmap information may be equal to the first uplink predetermined number or the second downlink predetermined number; wherein, in performing uplink transmission, the number of the bits of the bitmap information is determined according to the first uplink predetermined number, and in performing downlink transmission, the number of the bits of the bitmap information is determined according to the first downlink predetermined number.

In this embodiment, the number of the bits determined according to the first uplink predetermined number may indicate a second uplink resource on the second uplink frequency resource segment (containing the second uplink predetermined number of second uplink resource block groups), and the first uplink predetermined number and the second uplink predetermined number are not equal, or the number of the bits determined according to the first downlink predetermined number may indicate the second downlink resource on the second downlink frequency resource segment (containing the second downlink predetermined number of second downlink resource block groups), and the first downlink predetermined number and the second downlink predetermined number are not equal, thereby solving problem that the number of bits of the bitmap information indicating the current resources does not match the number of RBGs of target CCs or BWPs, without needing extra overhead, avoiding waste of control signaling resources, while lowering complexity of blind detection.

In this embodiment, as the manner for determining the first indication information indicating the second uplink resource is similar to the manner for determining the first indication information indicating the second downlink resource when the user equipment is switched from the first uplink frequency resource segment to the second uplink frequency resource segment or the user equipment is switched from the first downlink frequency resource segment to which the first uplink frequency resource segment corresponds to the second downlink frequency resource segment, in the following description, the second resource block may be the second uplink resource block or the second downlink resource block, the first resource block may be the first uplink resource block or the first downlink resource block, the second predetermined number may be the second uplink predetermined number or the second downlink predetermined number, and the first predetermined number may be the first uplink predetermined number or the first downlink predetermined number; that is, in a scenario in which uplink transmission is performed, the second resource block is the second uplink resource block, the first resource block may be the first uplink resource block, the second predetermined number is the second uplink predetermined number, the first predetermined number may be the first uplink predetermined number, and in a scenario in which downlink transmission is performed, the second resource block is the second downlink resource block, the first resource block may be the first downlink resource block, the second predetermined number is the second downlink predetermined number, and the first predetermined number may be the first downlink predetermined number, which shall be described below in a combined manner (applicable to all the following embodiments).

In this embodiment, the first indication information is determined by determining the second resource block indicated by each bit of the first indication information.

In this embodiment, for the convenience of description, the number of the second resource blocks indicated by each bit of the first indication information is hereinafter referred to as a size of a scheduled resource block group, wherein each bit of the first indication information indicates whether one or more scheduled resource block groups on the second frequency resource segment are allocated to the user equipment.

In one implementation, the number of the second resource blocks indicated by one bit of the first indication information is equal to a size of the second resource block group, wherein a method for determining the size of the second resource block group is as described above, which shall not be described herein any further.

In one implementation, the number of the second resource blocks indicated by one bit of the first indication information may be determined according to a first factor (which is a first uplink factor when the second resource is an uplink resource, or is a first downlink factor when the second resource is a downlink resource) and the size of the second resource block group, wherein the first factor may be determined according to the second predetermined number and the first predetermined number. Hence, scheduling of resource blocks may further be made to cover whole target frequency resource segments, thereby obtaining performance gains, and improving flexibility of the scheduling.

How to determine the factor shall be illustrated below.

1) Determining a ratio of the second predetermined number to the first predetermined number as the first factor α, i.e. $\alpha = N_2^{UL}/N_1^{UL}$ 或 $N_2^{DL}/N_1^{DL}$;

2) Determining the first factor according to a ratio of the second predetermined number to the first predetermined number and a correspondence between the ratio and the first factor α;

for example, the correspondence between the ratio and the first factor α may be preconfigured by the network side, and prestored at the network side and the user equipment side, and the correspondence may be a correspondence table, such as a table shown by Table 3 below.

TABLE 3

Correspondence between the first factor and the ratio of the second predetermined number to the first predetermined number

| Value range of the ratio Y | The first factor |
|---|---|
| 2 ≤ Y < 4 | 2 |
| 4 ≤ Y < 8 | 4 |
| 8 ≤ Y < 16 | 8 |
| Y ≥ 16 | 16 |

TABLE 4

Correspondence between the first factor and the ratio of the second predetermined number to the first predetermined number

| Value range of the ratio Y | The first factor |
|---|---|
| 1/4 < Y ≤ 1/2 | 1/2 |
| 1/8 Y ≤ 1/4 | 1/4 |
| 1/16 < Y ≤ 1/8 | 1/8 |
| Y ≤ 1/16 | 1/16 |

The correspondence is illustrated above by taking Table 3 and Table 4 as examples only. However, this embodiment is not limited thereto, and the correspondence may also be configured in other forms.

In this embodiment, the size of the scheduled resource block group is equal to a product of the first factor and the size of the second resource block group.

In this embodiment, in order that the first indication information may indicate all second resource block groups on the second frequency resource segment, in one implementation, the size of the scheduled resource block group may also be less than the product of the first factor and the size of the second resource block group. For example, when $Y=\alpha$, the size of the scheduled resource block group is $(\alpha-1) P_2^{U \backslash D}+N_{RB2}^{UL \backslash DL}-P_2^{U \backslash D}\times \lfloor N_{RB2}^{UL \backslash DL}/P_2^{U \backslash D}\rfloor$; wherein a last bit of the first indication information may be used to indicate the scheduled resource block group; and in one implementation, the size of the scheduled resource block group may also be greater than the product of the first factor and the size of the second resource block group. For example, when $Y\neq\alpha$, the size of the scheduled resource block group is $\alpha\times P_2^{U \backslash D}+N_{RB2}^{UL \backslash DL}-\alpha\times P_2^{U \backslash D}\times N_1^{UL \backslash DL}$; wherein a last bit of the first indication information may be used to indicate the scheduled resource block group. What described above is illustrative only, and this embodiment is not limited thereto. For example, the size of the scheduled resource block group may also be a value between $\alpha\times P_2^{U \backslash D}$ and $\alpha\times P_2^{U \backslash D}+N_{RB2}^{UL \backslash DL}-\alpha\times P_2^{U \backslash D}\times N_1^{UL \backslash DL}$.

In step 202, the first indication information may be carried by downlink control information (DCI) in a physical downlink control channel (PDCCH) carried on the first downlink frequency resource segment and transmitted to the user equipment.

The downlink control information may further be used to indicate the user equipment to be changed from the first uplink frequency resource segment to the second uplink frequency resource segment, or used to indicate the user equipment to be changed from the first downlink frequency resource segment to the second downlink frequency resource segment. For example, a bit in the DCI denoting an index of the second uplink or downlink frequency resource segment may be used to indicate the changing behavior. However, this embodiment is not limited thereto. For example, a new field may be set up in the DCI to indicate the changing behavior.

In this embodiment, one bit in the bitmap information may also be used to indicate that a second resource block group (RBG0) of a lowest index is taken as a starting point. For example, the one bit may be a first bit in the bitmap information.

It can be seen from the above embodiment that the second number of the resource block groups of target CCs or BWPs to be changed to or cross-CC or BWP scheduled is different from the first number of the resource block groups of the currently activated CCs or BWPs, and the indication information indicating the resources on target CCs or BWPs is determined according to the first number, thereby solving the problem that the number of bits of the bitmap information indicating the current resources does not match the number of RBGs of target CCs or BWPs, without needing extra overhead, avoiding waste of control signaling resources, while lowering complexity of blind detection.

Embodiment 2

The embodiment of this disclosure provides a resource indication method, applicable to a user equipment side. This embodiment corresponds to Embodiment 1, with contents identical thereto being not going to be described herein any further.

Figure 3:
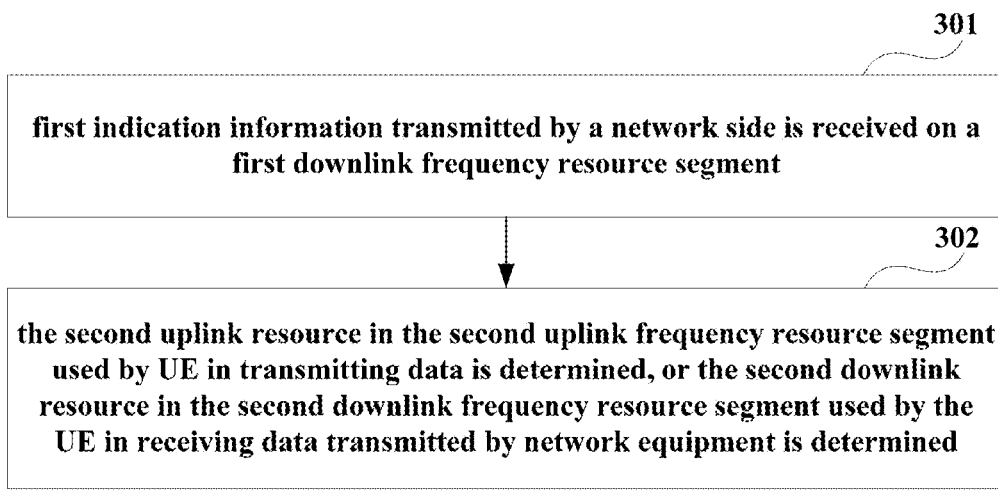
FIG. 3 is a schematic diagram of the resource indication method of Embodiment 2.

FIG. 3 is a schematic diagram of the resource indication method of this embodiment, which shall be described from a user equipment side. As shown in FIG. 3, the method includes:

step 301: first indication information transmitted by a network side is received on a first downlink frequency resource segment, the first indication information is used to indicate a second uplink resource in a second uplink frequency resource segment used by UE for transmitting data, or being used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups;

wherein, the first downlink frequency resource segment includes a first downlink predetermined number of first downlink resource block groups, the first downlink predetermined number is unequal to the second downlink predetermined number; or a first uplink frequency resource segment to which the first downlink frequency resource segment corresponds includes a first uplink predetermined number of first uplink resource block groups, the first uplink predetermined number being is unequal to the second uplink predetermined number; and wherein, the first indication information is bitmap information, a bit number of the bitmap information is determined according to the first uplink predetermined number or the first downlink predetermined number.

In this embodiment, reference may be made to Embodiment 1 for implementations of the first indication information, the first uplink frequency resource segment, the first downlink frequency resource segment, the second uplink frequency resource segment, the second downlink frequency resource segment, the first uplink/downlink resource block groups, the second uplink/downlink resource block groups, the first uplink/downlink predetermined numbers, and the second uplink/downlink predetermined numbers, which shall not be described herein any further.

In this embodiment, after the first indication information is received, the method may further include:

step 302: the second uplink resource in the second uplink frequency resource segment used by UE for transmitting data is determined according to the first indication information, or the second downlink resource in the second downlink frequency resource segment used by the UE in receiving data transmitted by network equipment is determined according to the first indication information; wherein a particular method for determining shall be described with reference to FIG. 4.

FIG. 4 is a schematic diagram of the resource indication method of this embodiment. As shown in FIG. 4, the method includes:

step 401: a user equipment needs to determine a length of the first indication information according to the first predetermined number when the user equipment detects a physical downlink control channel; wherein, reference may be made to Embodiment 1 for a particular implementation of determining a length of the first indication information according to the first predetermined number, which shall not be described herein any further;

step 402: the user equipment decodes downlink control information carrying the first indication information by performing blind detection on a PDCCH;

step 403: the user equipment reads the first indication information from a resource allocation domain of the downlink control information according to the length of the first indication information; and step 404: the user equipment determines the second uplink resource on the second uplink frequency resource segment used by the user equipment for transmitting data, or determines the second downlink resource on the second downlink frequency resource segment used by the user equipment in receiving the data transmitted by the network equipment, according to the first indication information.

For example, second resource blocks indicated by each bit of the first indication information is determined, wherein the number of the second resource blocks indicated by each bit is equal to the size of the second resource block group; or is determined according to the first factor and the size of the second resource block group; wherein the first factor is determined according to the second predetermined number and the first predetermined number. Reference may be made to Embodiment 1 for a particular implementation, which shall not be described herein further.

In this embodiment, one bit (such as the first bit) of the first indication information may also be used to indicate that the second resource block group with a lowest index is taken as a starting point of a resource.

In this embodiment, when the downlink control information is detected, the user equipment may determine that the network side indicates it to be changed from the first uplink frequency resource segment to the second uplink frequency resource segment, or indicates it to be changed from the first downlink frequency resource segment to the second downlink frequency resource segment, and the user equipment may reserve enough time for adjustment of an operating frequency and switched.

In this embodiment, the method may further include:

step 405: the user equipment transmits data to the network equipment side on the determined second uplink resource, or receives data transmitted by the network equipment side on the determined second downlink resource.

It should be noted that the embodiment of this disclosure is only illustrated in FIG. 4; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 4.

It can be seen from the above embodiment that the second number of the resource block groups of target CCs or BWPs to be changed to or cross-CC or BWP scheduled is different from the first number of the resource block groups of the currently activated CCs or BWPs, and the indication information indicating the resources on target CCs or BWPs is determined according to the first number, thereby solving the problem that the number of bits of the bitmap information indicating the current resources does not match the number of RBGs of target CCs or BWPs, without needing extra overhead, avoiding waste of control signaling resources, while lowering complexity of blind detection.

Embodiment 3

The embodiment of this disclosure provides a resource indication method, applicable to a network equipment side. This embodiment differs from Embodiment 1 in that the number of second resource blocks indicated by each bit of the first indication information does not need to be re-determined, but bits of the first indication information distributively indicate second resource block groups at predetermined positions in the second predetermined number of second resource block groups, thereby solving the problem that the number of bits of the bitmap information indicating the current resources does not match the number of RBGs of target CCs or BWPs, without needing extra overhead, avoiding waste of control signaling resources, while lowering complexity of blind detection, and making the scheduling of the resource blocks to cover whole target frequency resource segments.

Contents of this embodiment identical to those of Embodiment 1 shall not be described herein any further, and only different contents shall be described below.

In this embodiment, the bits of the first indication information (bitmap information) distributively indicate the second resource block groups at the predetermined positions in the second predetermined number of second resource block groups, that is, the second resource block groups at the predetermined positions indicated by the bits of the first indication information are distributively located on the second frequency resource segments, and in step 201, the first indication information is determined according to the predetermined positions.

In this embodiment, the number of the bits of the first indication information is identical to the number of the predetermined positions, and each bit of the first indication information correspondingly indicates a second resource block group at a predetermined position. As the predetermined positions are distributively located on the second frequency resource segment, the scheduling of the resource blocks may cover the whole target frequency resource segment, thereby avoiding scheduling only the bandwidth parts of the target frequency resource segment, and solving the problem that the number of bits of the bitmap information indicating the current resources does not match the number of RBGs of target CCs or BWPs, without needing extra overhead, avoiding waste of control signaling resources, while lowering complexity of blind detection.

In this embodiment, on the second frequency resource segment, one or more predetermined positions may be determined every fourth predetermined number of second resource block groups, so that the predetermined positions are distributively located on the second frequency resource segment.

In this embodiment, the predetermined positions may be pre-configured by the network side, or may be indicated via higher-layer signaling, or in order to save signaling overhead, the predetermined positions may be calculated according to the first predetermined number and the second predetermined number, which shall be described below.

The second predetermined number of second resource block groups are divided into a third predetermined number of first resource sets; wherein resource block groups in each first resource set are consecutive, and each first resource set includes candidate resource block groups and/or idle resource block groups. Positions of the candidate resource block groups are the predetermined positions, and the number of candidate resource blocks of all the first resource sets is equal to the first predetermined number; wherein the third predetermined number may be determined according to the first the predetermined number and the second predetermined number.

For example, when a ratio of the second predetermined number to the first predetermined number is greater than 1 and less than 2, $N_2^{UL \backslash DL}$ second resource block groups are divided into $N_3$ first resource sets, and the third predetermined number $N_3$ may be determined according to $N_1^{UL \backslash DL}$ and $N_2^{UL \backslash DL}$, for example, $N_3 = N_2^{UL \backslash DL} / \lfloor N_2^{UL \backslash DL} / N_2^{UL \backslash DL} - N_1^{UL \backslash DL} \rfloor$ is rounded up; wherein numbers of second resource block groups in each first resource set may be identical or different. For example, the number of second resource block groups in $N_3$–1 first resource sets is $\lfloor N_2^{UL\backslash DL}/N_2^{UL\backslash DL}-N_1^{UL\backslash DL}\rfloor$, each resource set in the $N_3$–1 first resource sets includes candidate resource block groups and an idle resource block group, the number of the idle resource block group being 1, and the rest being all candidate resource block groups. The number of second resource block groups in another one of first resource set is $N_2^{UL\backslash DL}-\lfloor N_2^{UL\backslash DL}/N_2^{UL\backslash DL}-N_1^{UL\backslash DL}\rfloor\times(N_3-1)$, and the one first resource set may include candidate resource block groups; wherein an index of the second resource block group in the one resource set is highest. However, this embodiment is not limited thereto, for example, the index of the second resource block group in the one resource set may be lowest. And the number of candidate resource blocks of all the first resource sets is equal to the first predetermined number.

FIG. 5 is a schematic diagram of distribution of the predetermined positions of this embodiment. As shown in FIG. 5, the first predetermined number is equal to 13 and the second predetermined number is equal to 17. The 17 second resource block groups are divided into 5 first resource sets; wherein former four first resource sets include four second resource block groups, former three thereof being candidate resource block groups, and the last thereof being an idle resource block group, and the last first resource set includes one second resource block group, which is a candidate resource block group, the candidate resource block group having 13 positions. Hence, the candidate resource block group may be indicated by the first indication information.

For example, when the ratio of the second predetermined number to the first predetermined number is greater than 2, the $N_2^{UL\backslash DL}$ second resource block groups are divided into $N_3$ first resource sets, and the third predetermined number $N_3$ may be determined according to $N_1^{UL\backslash DL}$ and $N_2^{UL\backslash DL}$, for example, $N_3=N_1^{UL\backslash DL}+1$; wherein, the numbers of the second resource block groups in each first resource set may be identical or different. For example, the number of second resource block groups in $N_3$–1 first resource sets is $\lfloor N_2^{UL\backslash DL}/N_1^{UL\backslash DL}\rfloor$, each resource set in the $N_3$–1 first resource sets includes a candidate resource block group and idle resource block groups, the number of the candidate resource block group being 1, and the rest being all idle resource block groups. The number of second resource block groups in another one of first resource set is $N_2^{UL\backslash DL}-\lfloor N_2^{UL\backslash DL}/N_1^{UL\backslash DL}\rfloor\times(N_3-1)$, and the one first resource set may include idle resource block groups only; wherein an index of the second resource block group in the one resource set is highest. However, this embodiment is not limited thereto, for example, the index of the second resource block group in the one resource set may be lowest. And the number of candidate resource blocks of all the first resource sets is equal to the first predetermined number.

Figure 6:
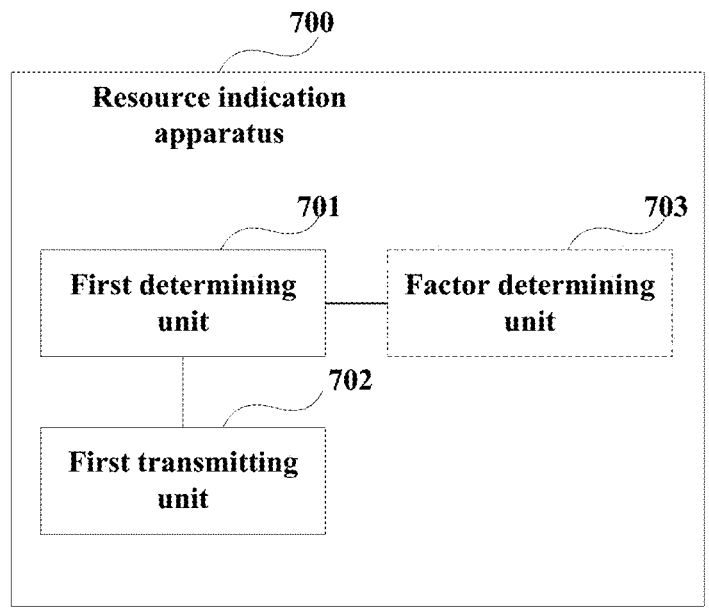
FIG. 6 is a schematic diagram of a predetermined position of Embodiment 3.

FIG. 6 is a schematic diagram of distribution of the predetermined positions in this embodiment. As shown in FIG. 6, the first predetermined number is equal to 12 and the second predetermined number is equal to 27. The 27 second resource block groups are divided into 13 first resource sets; wherein former 12 first resource sets include two second resource block groups, a former one thereof being a candidate resource block group, and the latter one thereof being an idle resource block group, and the last first resource set includes three second resource block groups, which are idle resource block groups, the candidate resource block group having 12 positions. Hence, the candidate resource block group may be indicated by the first indication information.

For example, when the ratio of the second predetermined number to the first predetermined number is equal to 2, the $N_2^{UL\backslash DL}$ second resource block groups are divided into $N_3$ first resource sets, and the third predetermined number is $N_3=N_1^{UL\backslash DL}$; for example, the number of the second resource block groups in the $N_3$ first resource sets is 2, each resource set in the $N_3$ first resource sets includes a candidate resource block group and an idle resource block group; however, this embodiment is not limited thereto.

In this embodiment, a manner for dividing the first resource sets may be predefined or preconfigured by the network side, the predetermined positions may be denoted by indices of the second resource block groups, and positions of the candidate resource block groups or the idle resource block groups in the first resource set may be pre-defined by the network side or may be pre-configured. In this embodiment, the method may further include (not shown): generating second indication information used to indicate the positions of the candidate resource block groups or idle resource block groups in the first resource set, and transmitting the second indication information to the user equipment. For example, the second indication information may be transmitted via RRC signalling. For example, the number of the second resource block groups in the first resource set is 4, a position of a candidate resource block group or an idle resource block group in the first resource set may be indicated as being a first position by second indication information "00", and a position of a candidate resource block group or an idle resource block group in the first resource set may be indicated as being a second position by second indication information "01". However, this embodiment is not limited thereto; for example, a position of a candidate resource block group in the first resource set is indicated as being a first position by "000", and a position of a idle resource block group in the first resource set is indicated as being a first position by "100", which shall not be enumerated herein any further.

In this embodiment, the method further includes (not shown): generating third indication information used to indicate a position of an index of a second resource block group indicated by a first bit of the first indication information, and transmitting the third indication information to the user equipment. For example, the third indication information being 0 indicates that the position of the index of the second resource block group indicated by the first bit of the first indication information is an RBG of a lowest index, and the third indication information being 1 indicates that the position of the index of the second resource block group indicated by the first bit of the first indication information is an RBG of a lowest index.

With the embodiment above, the problem that the number of bits of the bitmap information indicating the current resources does not match the number of RBGs of target CCs or BWPs may be solved, without needing extra overhead, avoiding waste of control signaling resources, while lowering complexity of blind detection, and making the scheduling of the resource blocks to cover whole target frequency resource segments.

Embodiment 4

The embodiment of this disclosure provides a resource indication method, applicable to a user equipment side. This embodiment corresponds to Embodiment 3, with contents identical thereto being not going to be described herein any further.

This embodiment differs from Embodiment 2 in that the number of the second resource blocks indicated by each bit of the first indication information does not need to be re-determined, but the bits of the first indication information distributively indicate second resource block groups at predetermined positions of the second predetermined number of second resource block groups, which solves the problem that the number of bits of the bitmap information indicating the current resources does not match the number of RBGs of target CCs or BWPs, without needing extra overhead, avoiding waste of control signaling resources, while lowering complexity of blind detection, and making the scheduling of the resource blocks to cover whole target frequency resource segments.

What are different from Embodiment 2 shall only be described below.

In step 302 or 404, the second resource on the second uplink frequency resource segment used by the user equipment for transmitting data is determined according to the first indication information, or the second resource on the second downlink frequency resource segment used by the user equipment in receiving the data transmitted by the network equipment is determined according to the first indication information.

For example, a position of a second resource block group indicated by each bit of the first indication information is determined; wherein the bits of the first indication information distributively indicate second resource block groups at predetermined positions in the second predetermined number of second resource block groups. Reference may be made to Embodiment 3 for a manner for determining the predetermined positions, which shall not be described herein any further.

In this embodiment, the method may further include (not shown): receiving second indication information indicating a position of a candidate resource block group or an idle resource block group in the first resource set; wherein the second predetermined number of second resource block groups are divided into a third predetermined number of first resource sets; wherein resource block groups in each first resource set are consecutive, each first resource set includes candidate resource block groups and/or idle resource block groups, positions of the candidate resource block groups are the predetermined positions, and the number of all the candidate resource blocks of the first resource set is equal to the first predetermined number;

or receiving third indication information indicating a position of an index of a second resource block group indicated by a first bit of the first indication information.

Reference may be made to Embodiment 3 for particular implementations of the second indication information and the third indication information, which shall not be described herein any further.

With the embodiment above, the problem that the number of bits of the bitmap information indicating the current resources does not match the number of RBGs of target CCs or BWPs may be solved, without needing extra overhead, avoiding waste of control signaling resources, while lowering complexity of blind detection, and making the scheduling of the resource blocks to cover whole target frequency resource segments.

Embodiment 5

The embodiment of this disclosure provides a resource indication apparatus, which may be, for example, a network equipment, or one or more components or assemblies configured in a network equipment. This embodiment corresponds to Embodiment 1, with contents identical to those in Embodiment 1 being not going to be described herein any further.

Figure 7:
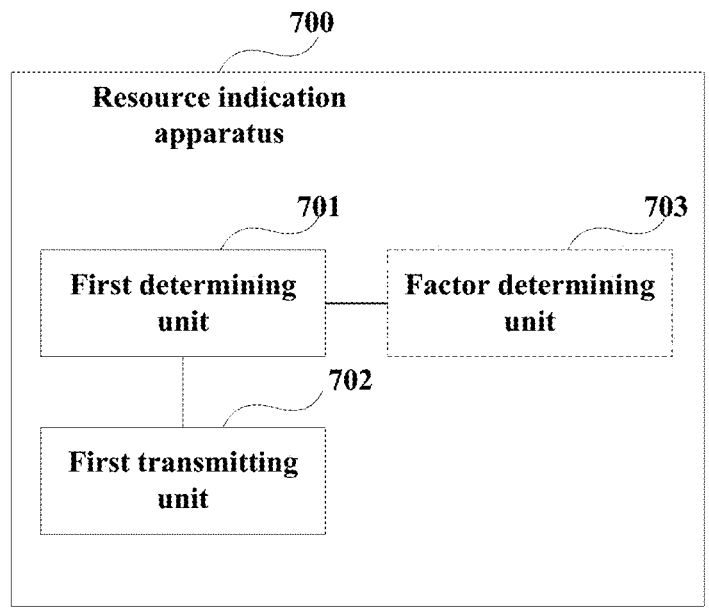
FIG. 7 is a schematic diagram of the resource indication apparatus of Embodiment 5.

FIG. 7 is a schematic diagram of the resource indication apparatus of the embodiment of this disclosure. As shown in FIG. 7, the apparatus 700 includes:

a first determining unit 701 configured to determine first indication information, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups; and a first transmitting unit 702 configured to transmit the first indication information to the UE in a first downlink frequency resource segment; wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

In this embodiment, reference may be made to steps 201-202 in Embodiment 1 for particular implementations of the first determining unit 701 and the first transmitting unit 702, which shall not be described herein any further.

In this embodiment, the first determining unit 701 determines second uplink resource blocks or second downlink resource blocks indicated by each bit of the first indication information, so as to determine the first indication information.

In one implementation, the number of the second uplink resource blocks indicated by each bit determined is equal to a size of the second uplink resource block group, or the number of the second downlink resource blocks indicated by each bit is equal to a size of the second downlink resource block group.

In one implementation, the number of the second uplink resource blocks indicated by each bit is determined according to a first uplink factor and a size of the second uplink resource block group, or the number of the second downlink resource blocks indicated by each bit is determined according to a first downlink factor and a size of the second downlink resource block group, and reference may be made to Embodiment 1 for particular implementations thereof. And in this implementation, the apparatus further includes:

a factor determining unit 703 configured to determine the first uplink factor according to the second uplink predetermined number and the first uplink predetermined number, or determine the first downlink factor according to the second downlink predetermined number and the first downlink predetermined number.

In this embodiment, the factor determining unit 703 determines a ratio of the second uplink predetermined number to the first uplink predetermined number as the first uplink factor, or determines a ratio of the second downlink predetermined number to the first downlink predetermined number as the first downlink factor, or determines the first uplink factor according to the ratio of the second uplink predetermined number to the first uplink predetermined number and a correspondence between the ratio and the first uplink factor, or determines the first downlink factor according to the ratio of the second downlink predetermined number to the first downlink predetermined number and a correspondence between the ratio and the first downlink factor, and reference may be made to Embodiment 1 for a particular implementation thereof.

In this embodiment, the number of the second uplink resource blocks indicated by each bit determined by the first determining unit 701 is equal to a product of the first uplink factor and the size of the second uplink resource block group, or the determined number of the second downlink resource blocks indicated by each bit is equal to a product of the first downlink factor and the size of the second downlink resource block group.

In this embodiment, the first transmitting unit 702 carries the first indication information via downlink control information.

In this embodiment, a bit of the bitmap information is used to indicate that a second uplink resource block group of a lowest index or a second downlink resource block group of a lowest index is taken as a starting point of a resource.

In this embodiment, the downlink control information is further used to indicate that the UE is changed over to the second uplink frequency resource segment from the first uplink frequency resource segment, or is used to indicate that the UE is changed over to the second downlink frequency resource segment from the first downlink frequency resource segment.

It should be noted that the components or modules related to this disclosure are only described above; however, this disclosure is not limited thereto. For example, the resource indication apparatus 700 may further include other components or modules, and reference may be made to related techniques for particulars of these components or modules.

It can be seen from the above embodiment that the second number of the resource block groups of the target CCs or BWPs to be changed to or cross-CC or BWP scheduled is different from the first number of the resource block groups of the currently activated CCs or BWPs, and the indication information indicating the resources on the target CCs or BWPs is determined according to the first number, which solve the problem that the number of bits of the bitmap information indicating the current resources does not match the number of RBGs of target CCs or BWPs, without needing extra overhead, avoiding waste of control signaling resources, while lowering complexity of blind detection.

Embodiment 6

The embodiment of this disclosure provides a resource indication apparatus, which may be, for example, a user equipment, or one or more components or assemblies configured in a user equipment. This embodiment corresponds to Embodiment 2, with contents identical to those in Embodiment 2 being not going to be described herein any further.

Figure 8:
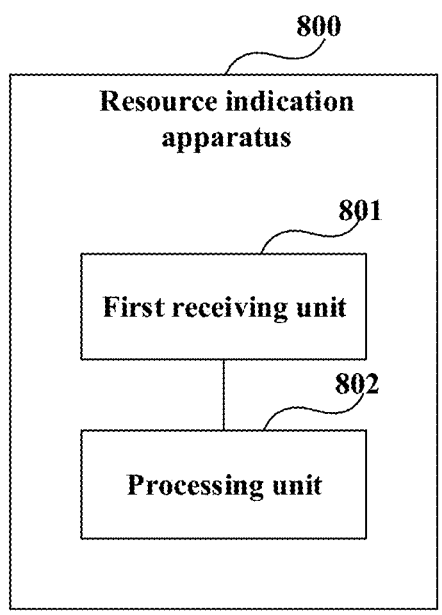
FIG. 8 is a schematic diagram of the resource indication apparatus of Embodiment 6.

FIG. 8 is a schematic diagram of the resource indication apparatus of the embodiment of this disclosure. As shown in FIG. 8, the apparatus 800 includes:

a first receiving unit 801 configured to receive, from a first downlink frequency resource segment, first indication information transmitted by a network side, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups;

wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

In this embodiment, the apparatus may further include:

a processing unit 802 configured to determine the second uplink resource in the second uplink frequency resource segment used by UE for transmitting data, or the second downlink resource in the second downlink frequency resource segment used by network equipment for transmitting data;

for example, second uplink (or downlink) resource blocks indicated by each bit of the first indication information are determined; wherein, the number of the second uplink (or downlink) resource blocks indicated by each bit is equal to a size of the second uplink (or downlink) resource block group, or the number of the second uplink (or downlink) resource blocks are determined according to a first uplink (or downlink) factor and a size of the second uplink (or downlink) resource block group; and wherein, the first factor is determined according to the second predetermined number and the first predetermined number.

In this embodiment, reference may be made to steps 301-302 and 401-404 in Embodiment 2 for particular implementations of the first receiving unit 801 and the processing unit 802, which shall not be described herein any further.

It should be noted that the components or modules related to this disclosure are only described above; however, this disclosure is not limited thereto. For example, the resource indication apparatus 800 may further include other components or modules, and reference may be made to related techniques for particulars of these components or modules.

It can be seen from the above embodiment that the second number of the resource block groups of the target CCs or BWPs to be changed to or cross-CC or BWP scheduled is different from the first number of the resource block groups of the currently activated CCs or BWPs, and the indication information indicating the resources on the target CCs or BWPs is determined according to the first number, which solve the problem that the number of bits of the bitmap information indicating the current resources does not match the number of RBGs of target CCs or BWPs, without needing extra overhead, avoiding waste of control signaling resources, while lowering complexity of blind detection.

Embodiment 7

The embodiment of this disclosure provides a resource indication apparatus, which may be, for example, a network equipment, or one or more components or assemblies configured in a network equipment. This embodiment corresponds to Embodiment 3, with contents identical to those in Embodiment 3 being not going to be described herein any further.

Figure 9:
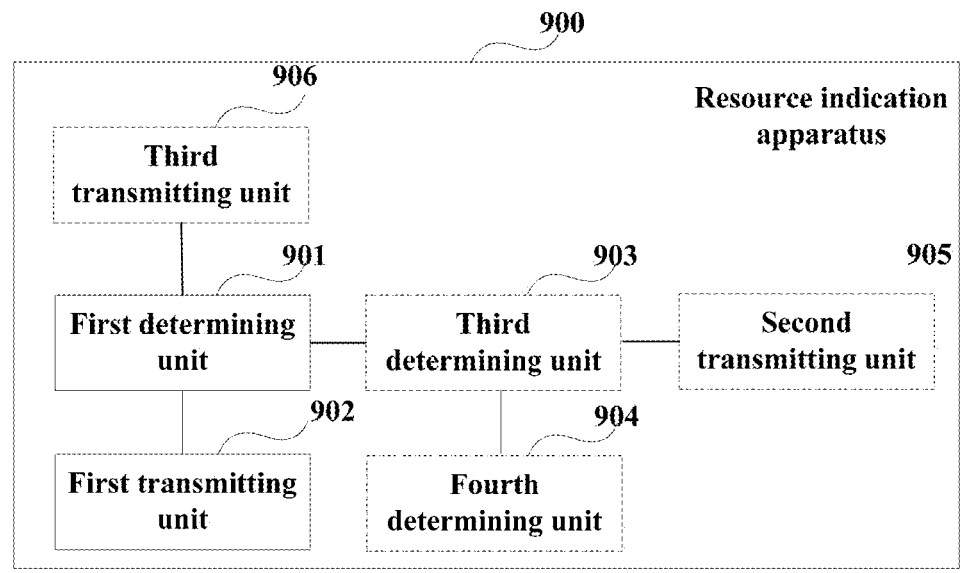
FIG. 9 is a schematic diagram of the resource indication apparatus of Embodiment 7.

FIG. 9 is a schematic diagram of the resource indication apparatus of the embodiment of this disclosure. As shown in FIG. 9, the resource indication apparatus 900 includes:

a first determining unit 901 configured to determine first indication information, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups; and a first transmitting unit 902 configured to transmit the first indication information to the UE in a first downlink frequency resource segment; wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

In this embodiment, reference may be made to Embodiment 3 for particular implementations of the first determining unit 901 and the first transmitting unit 902, which shall not be described herein any further.

What are different from Embodiment 5 are that in this embodiment, the bits of the bitmap information distributively indicate the second uplink (or downlink) resource block groups of the predetermined positions of the second uplink (or downlink) predetermined number of second uplink (or downlink) resource block groups, and the first determining unit 901 determines the first indication information according to the predetermined positions.

In this embodiment, the apparatus may further include a third determining unit 903 configured to determine the predetermined positions; wherein the third determining unit 903 divides the second uplink (or downlink) predetermined number of second uplink (or downlink) resource block groups into a third predetermined number of first resource sets; wherein resource block groups in each first resource set are consecutive, and each first resource set includes candidate resource block groups and/or idle resource block groups. Positions of the candidate resource block groups are the predetermined positions, and the number of candidate resource blocks of all the first resource sets is equal to the first uplink (or downlink) predetermined number.

In this embodiment, the apparatus may further include a fourth determining unit 904 configured to determine the third predetermined number; wherein, the fourth determining unit 904 determines the third predetermined number according to the first uplink (or downlink) predetermined number and the second uplink (or downlink) predetermined number.

In this embodiment, reference may be made to Embodiment 3 for particular implementations of the third determining unit 903 and the fourth determining unit 904, which shall not be described herein any further.

In this embodiment, the apparatus may further include a second transmitting unit 905 configured to transmit second indication information to the user equipment, the second indication information is used to indicate positions of candidate resource block groups or positions of idle resource block groups in the first resource set.

In this embodiment, the apparatus may further include a third transmitting unit 906 configured to transmit third indication information to the user equipment, the third indication information indicating positions of indices of the second uplink (or downlink) resource block groups indicated by the first bit of the first indication information.

In this embodiment, reference may be made to Embodiment 3 for particular implementations of the second indication information and the third indication information, which shall not be described herein any further.

In this embodiment, the first transmitting unit 902 carries the first indication information via downlink control information.

In this embodiment, one bit of the bitmap information is used to indicate that a second uplink (or downlink) resource block group of a lowest index is taken as a starting point of a resource.

In this embodiment, the downlink control information is further used to indicate that the UE is changed over to the second uplink frequency resource segment from the first uplink frequency resource segment, or is used to indicate that the UE is changed over to the second downlink frequency resource segment from the first downlink frequency resource segment.

It should be noted that the components or modules related to this disclosure are only described above; however, this disclosure is not limited thereto. For example, the resource indication apparatus 900 may further include other components or modules, and reference may be made to related techniques for particulars of these components or modules.

With the embodiment above, the problem that the number of bits of the bitmap information indicating the current resources does not match the number of RBGs of target CCs or BWPs may be solved, without needing extra overhead, avoiding waste of control signaling resources, while lowering complexity of blind detection, and making the scheduling of the resource blocks to cover whole target frequency resource segments.

Embodiment 8

The embodiment of this disclosure provides a resource indication apparatus, which may be, for example, a user equipment, or one or more components or assemblies configured in a user equipment. This embodiment corresponds to Embodiment 4, with contents identical to those in Embodiment 4 being not going to be described herein any further.

Figure 10:
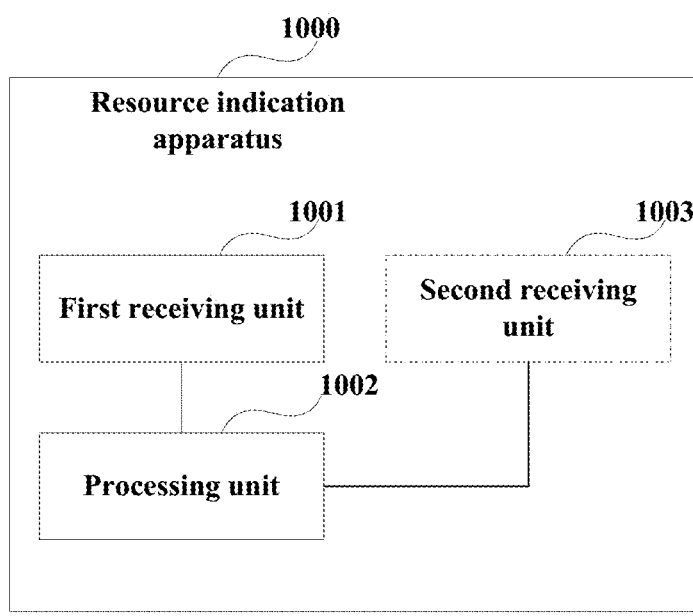
FIG. 10 is a schematic diagram of the resource indication apparatus of Embodiment 8.

FIG. 10 is a schematic diagram of the resource indication apparatus of the embodiment of this disclosure. As shown in FIG. 10, the resource indication apparatus 1000 includes:

a first receiving unit 1001 configured to receive, from a first downlink frequency resource segment, first indication information transmitted by a network side, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups;

wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

In this embodiment, the apparatus may further include:

a processing unit 1002 configured to determine predetermined positions of the second uplink (or downlink) resource block groups indicated by each bit of the first indication information; wherein the bits of the bitmap information distributively indicate the second uplink (or downlink) resource block groups of the predetermined positions of the second uplink (or downlink) predetermined number of second uplink (or downlink) resource block groups.

In this embodiment, the apparatus may further include:

a second receiving unit 1003 configured to receive second indication information indicating a position of a candidate resource block group or a position of an idle resource block group in the first resource set; wherein the second uplink (or downlink) predetermined number of second uplink (or downlink) resource block groups are divided into a third predetermined number of first resource sets; wherein resource block groups in each first resource set are consecutive, each first resource set includes candidate resource block groups and/or idle resource block groups, positions of the candidate resource block groups are the predetermined positions, and the number of all the candidate resource blocks of the first resource set is equal to the first uplink (or downlink) predetermined number;

or configured to receive third indication information indicating a position of an index of a second uplink (or downlink) resource block group indicated by a first bit of the first indication information.

In this embodiment, reference may be made to Embodiment 3 for particular implementations of the second indication information and the third indication information, which shall not be described herein any further.

In this embodiment, reference may be made to Embodiment 4 for particular implementations of the first receiving unit 1001, the processing unit 1002 and the second receiving unit 1003, which shall not be described herein any further.

It should be noted that the components or modules related to this disclosure are only described above; however, this disclosure is not limited thereto. For example, the resource indication apparatus 1000 may further include other components or modules, and reference may be made to related techniques for particulars of these components or modules.

With the embodiment above, the problem that the number of bits of the bitmap information indicating the current resources does not match the number of RBGs of target CCs or BWPs may be solved, without needing extra overhead, avoiding waste of control signaling resources, while lowering complexity of blind detection, and making the scheduling of the resource blocks to cover whole target frequency resource segments.

Embodiment 9

The embodiment of this disclosure provides a communication system, FIG. 1 being able to be referred to for the communication system, with contents identical to those in embodiments 1-8 being not going to be described herein any further. In this embodiment, the communication system 100 may include:

a network equipment 101 configured with the resource indication apparatus 700 described in Embodiment 5; and a user equipment 102 configured with the resource indication apparatus 800 described in Embodiment 6.

Or, the communication system 100 may include:

a network equipment 101 configured with the resource indication apparatus 900 described in Embodiment 7; and a user equipment 102 configured with the resource indication apparatus 1000 described in Embodiment 8.

The embodiment of this disclosure further provides a network equipment, which may be, for example, a base station. However, this disclosure is not limited thereto, and it may also be another network equipment.

Figure 11:
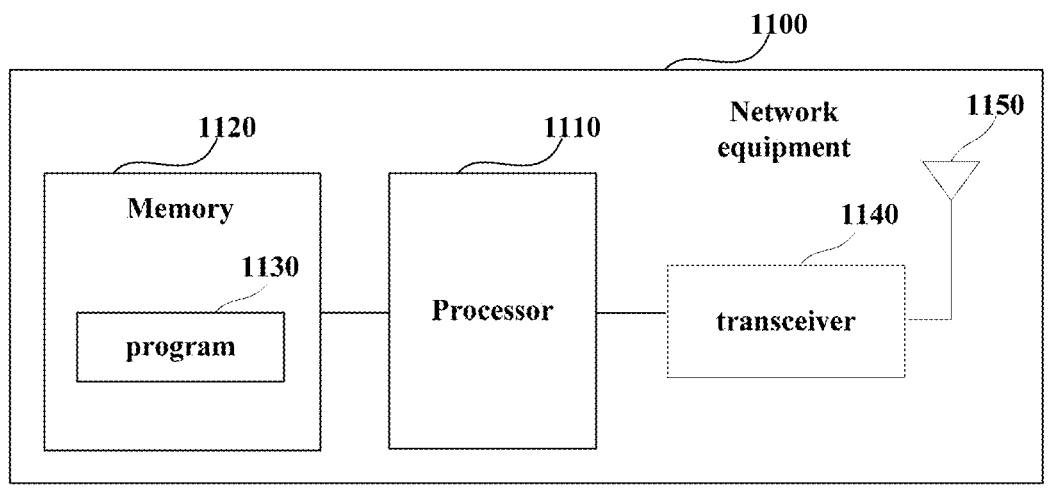
FIG. 11 is a schematic diagram of the network equipment of an embodiment of this disclosure.

FIG. 11 is a schematic diagram of a structure of the network equipment of the embodiment of this disclosure. As shown in FIG. 11, the network equipment 1100 may include a processor 1110 (such as a central processing unit (CPU)) and a memory 1120, the memory 1120 being coupled to the processor 1110. The memory 1120 may store various data, and furthermore, it may store a program 1130 for data processing, and execute the program 1130 under control of the processor 1110.

Furthermore, as shown in FIG. 11, the network equipment 1100 may include a transceiver 1140, and an antenna 1150, etc. Functions of the above components are similar to those in the related art, and shall not be described herein any further. It should be noted that the network equipment 1100 does not necessarily include all the parts shown in FIG. 11, and furthermore, the network equipment 1100 may include parts not shown in FIG. 11, and the related art may be referred to.

For example, the processor 1110 may be configured to execute the program 1130 to carry out the resource indication method of Embodiment 1 or 3. For example, the processor 1110 may be configured to execute the following control: determining first indication information, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups; and controlling the transceiver 1140 to transmit the first indication information to the UE in a first downlink frequency resource segment via the antenna 1150; wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

In this embodiment, reference may be made to Embodiment 1 or 3 for a particular implementation of the processor 1110; functions of the first determining unit 701, 901, the factor determining unit 703, the third determining unit 903, and the fourth determining unit 904 in Embodiment 5 or 7 may all be executed by the processor 1110; and functions of the second transmitting unit 905 and the third transmitting unit 906 may be executed by the transceiver 1140 and the antenna 1150, and this embodiment is not limited thereto.

The embodiment of this disclosure further provides a user equipment, however, this disclosure is not limited thereto, and it may also be another equipment.

Figure 12:
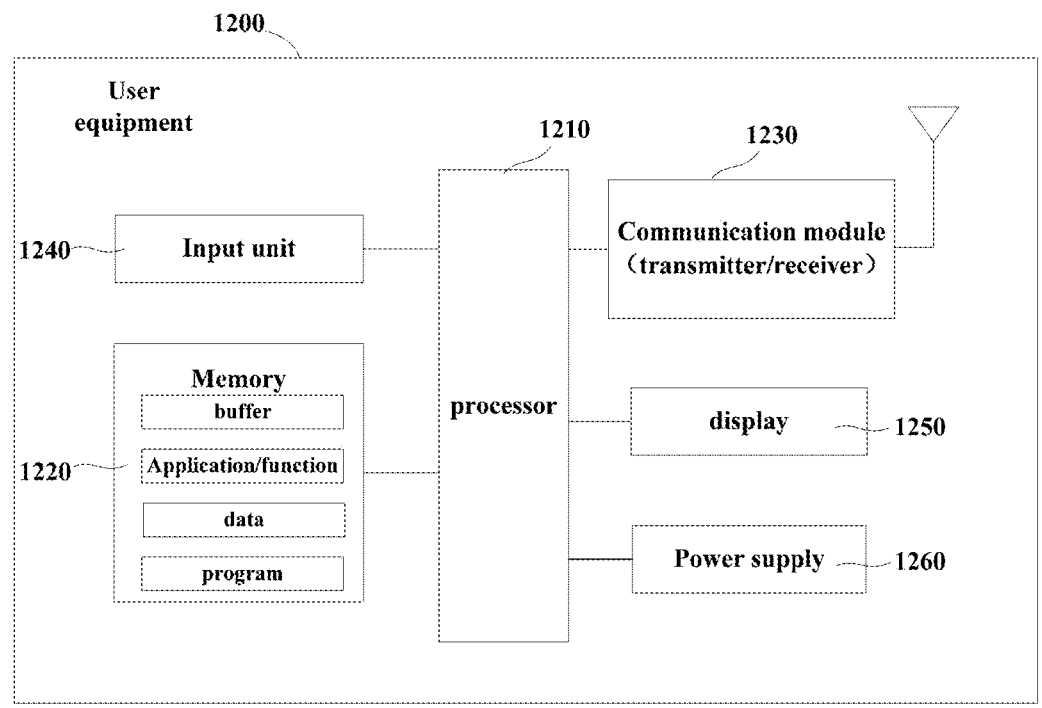
FIG. 12 is a schematic diagram of the user equipment of an embodiment of this disclosure.

FIG. 12 is a schematic diagram of the user equipment of the embodiment of this disclosure. As shown in FIG. 12, the user equipment 1200 may include a processor 1210 and a memory 1220, the memory 1220 storing data and a program and being coupled to the processor 1210. It should be noted that this figure is illustrative only, and other types of structures may also be used, so as to supplement or replace this structure and achieve a telecommunications function or other functions.

As shown in FIG. 12, the user equipment 1200 may further include a communication module 1230, an input unit 1240, a display 1250, and a power supply 1260; wherein functions of the above components are similar to those in the related art, and the communication module 1230 may include a transceiver and an antenna, which shall not be described herein any further. It should be noted that the user equipment 1200 does not necessarily include all the parts shown in FIG. 12, and the above components are not necessary. Furthermore, the user equipment 1200 may include parts not shown in FIG. 12, and the related art may be referred to.

For example, the processor 1210 may be configured to execute the program to carry out the resource indication method of Embodiment 2 or 4. For example, the processor 1210 may be configured to execute the following control: controlling the communication module 1230 to receive, from a first downlink frequency resource segment, first indication information transmitted by a network side, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups; wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

For example, the processor 1210 may further be configured to determine the second uplink resource in the second uplink frequency resource segment used by UE for transmitting data, or the second downlink resource in the second downlink frequency resource segment used by network equipment for transmitting data.

In this embodiment, reference may be made to Embodiment 2 or 4 for a particular implementation of the processor 1210; functions of the processing unit 802, 1002 in Embodiment 6 or 8 may be executed by the processor 1210; and functions of the first receiving unit 801, 1001 and the second receiving unit 1003 may be executed by the communication module 1230, and this embodiment is not limited thereto.

An embodiment of the present disclosure provides a computer readable program, which, when executed in a network equipment, will cause the network equipment to carry out the resource indication method as described in Embodiment 1.

An embodiment of the present disclosure provides a computer readable program, which, when executed in a user equipment, will cause the user equipment to carry out the resource indication method as described in Embodiment 2.

An embodiment of the present disclosure provides a computer readable medium, including a computer readable program, which will cause a network equipment to carry out the resource indication method as described in Embodiment 3.

An embodiment of the present disclosure provides a computer readable medium, including a computer readable program, which will cause a user equipment to carry out the resource indication method as described in Embodiment 4.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 7-10 (such as the receiving unit and the processing unit) may either correspond to software modules of procedures of a computer program, or correspond to hardware modules. Such software modules may respectively correspond to the steps shown in FIGS. 2-4. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

As to implementations containing the above embodiments, following supplements are further provided in this disclosure.

Supplement 1. A resource indication method, including:

determining first indication information, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups; and transmitting the first indication information to the UE in a first downlink frequency resource segment; wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

Supplement 2. The method according to supplement 1, wherein second uplink resource blocks or second downlink resource blocks indicated by each bit of the first indication information are determined, so as to determine the first indication information.

Supplement 3. The method according to supplement 2, wherein the determined number of the second uplink resource blocks indicated by each bit is equal to a size of the second uplink resource block group, or the determined number of the second downlink resource blocks indicated by each bit is equal to a size of the second downlink resource block group.

Supplement 4. The method according to supplement 2, wherein the determined number of the second uplink resource blocks indicated by each bit is determined according to a first uplink factor and a size of the second uplink resource block group, or the determined number of the second downlink resource blocks indicated by each bit is determined according to a first downlink factor and a size of the second downlink resource block group; and wherein, the method further includes:

determining the first uplink factor according to the second uplink predetermined number and the first uplink predetermined number, or determining the first downlink factor according to the second downlink predetermined number and the first downlink predetermined number.

Supplement 5. The method according to supplement 4, wherein a ratio of the second uplink predetermined number to the first uplink predetermined number is determined as the first uplink factor, or a ratio of the second downlink predetermined number to the first downlink predetermined number is determined as the first downlink factor, or the first uplink factor is determined according to the ratio of the second uplink predetermined number to the first uplink predetermined number and a correspondence between the ratio and the first uplink factor, or the first downlink factor is determined according to the ratio of the second downlink predetermined number to the first downlink predetermined number and a correspondence between the ratio and the first downlink factor.

Supplement 6. The method according to supplement 4, wherein the determined number of the second uplink resource blocks indicated by each bit is equal to a product of the first uplink factor and the size of the second uplink resource block group, or the determined number of the second downlink resource blocks indicated by each bit is equal to a product of the first downlink factor and the size of the second downlink resource block group.

Supplement 7. The method according to supplement 1, wherein bits of the bitmap information distributively indicate second uplink resource block groups at predetermined positions in the second uplink predetermined number of second uplink resource block groups, or distributively indicate second downlink resource block groups at predetermined positions in the second downlink predetermined number of second downlink resource block groups, and the first indication information is determined according to the predetermined positions.

Supplement 8. The method according to supplement 7, wherein the method further includes:

determining the predetermined positions; wherein the second uplink predetermined number of second uplink resource block groups or the second downlink predetermined number of second downlink resource block groups are divided into a third predetermined number of first resource sets; wherein, resource block groups in each of the first resource sets are consecutive, and each of the first resource sets includes candidate resource block groups and/or idle resource block groups, positions of the candidate resource block groups being the predetermined positions, and the number of candidate resource blocks of all the first resource sets being equal to the first uplink predetermined number or the first downlink predetermined number.

Supplement 9. The method according to supplement 8, wherein the method further includes:

determining the third predetermined number; wherein the third predetermined number is determined according to the first uplink predetermined number and the second uplink predetermined number, or the third predetermined number is determined according to the first downlink predetermined number and the second downlink predetermined number.

Supplement 10. The method according to supplement 1, wherein the first indication information is carried via downlink control information.

Supplement 11. The method according to supplement 1, wherein a bit of the bitmap information is used to indicate that a second uplink resource block group of a lowest index or a second downlink resource block group of a lowest index is taken as a starting point of a resource.

Supplement 12. The method according to supplement 10, wherein the downlink control information is further used to indicate that the UE is changed over to the second uplink frequency resource segment from the first uplink frequency resource segment, or is used to indicate that the UE is changed over to the second downlink frequency resource segment from the first downlink frequency resource segment.

Supplement 13. The method according to supplement 9, wherein the method further includes:

transmitting second indication information to the UE, the second indication information is used to indicate positions of the candidate resource block groups or positions of the idle resource block groups in the first resource set.

Supplement 14. The method according to supplement 1, wherein the method further includes:

transmitting third indication information to the UE, the third indication information is used to indicate a position of an index of a second uplink resource block group or a second downlink resource block group indicated by a first bit of the first indication information.

Supplement 15. A resource indication method, including:

receiving, from a first downlink frequency resource segment, first indication information transmitted by a network side, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment includes a second uplink predetermined number of second uplink resource block groups, and the second downlink frequency resource segment includes a second downlink predetermined number of second downlink resource block groups;

wherein, the first downlink frequency resource segment includes a first downlink predetermined number of first downlink resource block groups, the first downlink predetermined number being unequal to the second downlink predetermined number; or a first uplink frequency resource segment to which the first downlink frequency resource segment corresponds includes a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

Supplement 16. The method according to supplement 15, wherein the method further includes:

determining the second uplink resource in the second uplink frequency resource segment used by UE for transmitting data, or the second downlink resource in the second downlink frequency resource segment used by network equipment for transmitting data, according to the first indication information;

wherein, second uplink resource blocks or second downlink resource blocks indicated by each bit of the first indication information are determined according to the first indication information; wherein, the number of the second uplink resource blocks indicated by each bit is equal to a size of the second uplink resource block group, or the number of the second downlink resource blocks indicated by each bit is equal to a size of the second downlink resource block group, or the number of the second uplink resource blocks indicated by each bit is determined according to a first uplink factor and a size of the second uplink resource block group, or the number of the second downlink resource blocks indicated by each bit is determined according to a first downlink factor and a size of the second downlink resource block group; and wherein, the first uplink factor is determined according to the second uplink predetermined number and the first uplink predetermined number, and the first downlink factor is determined according to the second downlink predetermined number and the first downlink predetermined number;

or predetermined positions of the second uplink resource block groups or the second downlink resource block groups indicated by each bit of the first indication information are determined according to the first indication information; wherein, bits of the bitmap information distributively indicate second uplink resource block groups at the predetermined positions in the second uplink predetermined number of second uplink resource block groups, or distributively indicate second downlink resource block groups at the predetermined positions in the second downlink predetermined number of second downlink resource block groups.

Supplement 17. The method according to supplement 16, wherein a ratio of the second uplink predetermined number to the first uplink predetermined number is determined as the first uplink factor, or a ratio of the second downlink predetermined number to the first downlink predetermined number is determined as the first downlink factor, or the first uplink factor is determined according to a ratio of the second uplink predetermined number to the first uplink predetermined number and a correspondence between the ratio and the first uplink factor, or the first downlink factor is determined according to a ratio of the second downlink predetermined number to the first downlink predetermined number and a correspondence between the ratio and the first downlink factor.

Supplement 18. The method according to supplement 16, wherein the determined number of the second uplink resource blocks indicated by each bit is equal to a product of the first uplink factor and the size of the second uplink resource block group, or the number of the second downlink resource blocks indicated by each bit is equal to a product of the first downlink factor and the size of the second downlink resource block group.

Supplement 19. The method according to supplement 15, wherein the apparatus further includes:

receiving second indication information indicating positions of candidate resource block groups in first resource sets or positions of idle resource block groups in the first resource sets; wherein, the second uplink predetermined number of second uplink resource block groups or the second downlink predetermined number of second downlink resource block groups are divided into a third predetermined number of the first resource sets; wherein, resource block groups in each of the first resource sets are consecutive, and each of the first resource sets includes candidate resource block groups and/or idle resource block groups, positions of the candidate resource block groups being the predetermined positions, and the number of candidate resource blocks of all the first resource sets being equal to the first uplink predetermined number or the first downlink predetermined number;

or receiving third indication information indicating a position of an index of a second uplink resource block group or a second downlink resource block group indicated by a first bit of the first indication information.

What is claimed is:

1. A resource indication apparatus, comprising:
a processor configured to determine first indication information, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment comprises a second uplink predetermined number of second uplink resource block groups, and the second downlink frequency resource segment comprises a second downlink predetermined number of second downlink resource block groups; and
a transmitter configured to transmit the first indication information to the UE in a first downlink frequency resource segment; wherein, the first downlink frequency resource segment comprises a first downlink predetermined number of first downlink resource block groups, the first downlink predetermined number being unequal to the second downlink predetermined number; or a first uplink frequency resource segment to which the first downlink frequency resource segment corresponds comprises a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number.

2. The apparatus according to claim 1, wherein the processor determines second uplink resource blocks or second downlink resource blocks indicated by each bit of the first indication information, so as to determine the first indication information.

3. The apparatus according to claim 2, wherein the number of the second uplink resource blocks indicated by each bit determined by the processor is equal to a size of the second uplink resource block group, or the number of the second downlink resource blocks indicated by each bit determined by the processor is equal to a size of the second downlink resource block group.

4. The apparatus according to claim 2, wherein the number of the second uplink resource blocks indicated by each bit determined by the processor is determined according to a first uplink factor and a size of the second uplink resource block group, or the number of the second downlink resource blocks indicated by each bit determined by the processor is determined according to a first downlink factor and a size of the second downlink resource block group; and wherein, the processor further
configured to determine the first uplink factor according to the second uplink predetermined number and the first uplink predetermined number, or determine the first downlink factor according to the second downlink predetermined number and the first downlink predetermined number.

5. The apparatus according to claim 4, wherein the processor determines a ratio of the second uplink predetermined number to the first uplink predetermined number as the first uplink factor, or determines a ratio of the second downlink predetermined number to the first downlink predetermined number as the first downlink factor, or determines the first uplink factor according to the ratio of the second uplink predetermined number to the first uplink predetermined number and a correspondence between the ratio and the first uplink factor, or determines the first downlink factor according to the ratio of the second downlink predetermined number to the first downlink predetermined number and a correspondence between the ratio and the first downlink factor.

6. The apparatus according to claim 4, wherein the number of the second uplink resource blocks indicated by each bit determined by the processor is equal to a product of the first uplink factor and the size of the second uplink resource block group, or the determined number of the second downlink resource blocks indicated by each bit is equal to a product of the first downlink factor and the size of the second downlink resource block group.

7. The apparatus according to claim 1, wherein bits of the bitmap information distributively indicate second uplink resource block groups at predetermined positions in the second uplink predetermined number of second uplink resource block groups, or distributively indicate second downlink resource block groups at predetermined positions in the second downlink predetermined number of second downlink resource block groups, and the processor determines the first indication information according to the predetermined positions.

8. The apparatus according to claim 7, wherein the processor
determine the predetermined positions;
the processor divides the second uplink predetermined number of second uplink resource block groups or the second downlink predetermined number of second downlink resource block groups into a third predetermined number of first resource sets; wherein, resource block groups in each of the first resource sets are consecutive, and each of the first resource sets comprises candidate resource block groups and/or idle resource block groups, positions of the candidate resource block groups being the predetermined positions, and the number of candidate resource blocks of all the first resource sets being equal to the first uplink predetermined number or the first downlink predetermined number.

9. The apparatus according to claim 8, wherein the processor is further configured to
determine the third predetermined number;
the processor determines the third predetermined number according to the first uplink predetermined number and the second uplink predetermined number, or determining the third predetermined number according to the first downlink predetermined number and the second downlink predetermined number.

10. The apparatus according to claim 1, wherein the transmitter carries the first indication information via downlink control information.

11. The apparatus according to claim 1, wherein a bit of the bitmap information is used to indicate that a second uplink resource block group of a lowest index or a second downlink resource block group of a lowest index is taken as a starting point of a resource.

12. The apparatus according to claim 10, wherein the downlink control information is further used to indicate that the UE is changed over to the second uplink frequency resource segment from the first uplink frequency resource segment, or is used to indicate that the UE is changed over to the second downlink frequency resource segment from the first downlink frequency resource segment.

13. The apparatus according to claim 9, wherein the transmitter is further
configured to transmit second indication information to the UE, the second indication information is used to indicate positions of the candidate resource block groups or positions of the idle resource block groups in the first resource set.

14. The apparatus according to claim 1, wherein the transmitter is further configured to
transmit third indication information to the UE, the third indication information is used to indicate a position of an index of a second uplink resource block group or a second downlink resource block group indicated by a first bit of the first indication information.

15. A resource indication apparatus, comprising:
a receiver configured to receive, from a first downlink frequency resource segment, first indication information transmitted by a network side, the first indication information is used to indicate a second uplink resource in a second uplink frequency resource segment used by UE for transmitting data, or is used to indicate a second downlink resource in a second downlink frequency resource segment used by network equipment for transmitting data; wherein, the second uplink frequency resource segment comprises a second uplink predetermined number of second uplink resource block groups, and the second downlink frequency resource segment comprises a second downlink predetermined number of second downlink resource block groups;
wherein, the first downlink frequency resource segment comprises a first downlink predetermined number of first downlink resource block groups, the first downlink predetermined number being unequal to the second downlink predetermined number; or a first uplink frequency resource segment to which the first downlink frequency resource segment corresponds comprises a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number;
a processor configured to determine the second uplink resource in the second uplink frequency resource segment used by UE for transmitting data, or the second downlink resource in the second downlink frequency resource segment used by network equipment for transmitting data, according to the first indication information;
wherein, the processor determines second uplink resource blocks or second downlink resource blocks indicated by each bit of the first indication information according to the first indication information; wherein, the number of the second uplink resource blocks indicated by each bit is equal to a size of the second uplink resource block group, or the number of the second downlink resource blocks indicated by each bit is equal to a size of the second downlink resource block group, or the number of the second uplink resource blocks indicated by each bit is determined according to a first uplink factor and a size of the second uplink resource block group, or the number of the second downlink resource blocks indicated by each bit is determined according to a first downlink factor and a size of the second downlink resource block group; and wherein, the first uplink factor is determined according to the second uplink predetermined number and the first uplink predetermined number, and the first downlink factor is determined according to the second downlink predetermined number and the first downlink predetermined number;
or the processor determined predetermined positions of the second uplink resource block groups or the second downlink resource block groups indicated by teach bit of the first indication information according to the first indication information; wherein, bits of the bitmap information distributively indicate second uplink resource block groups at the predetermined positions in the second uplink predetermined number of second uplink resource block groups, or distributively indicated second downlink resource block groups at the predetermined positions in the second downlink predetermined nu umber of second downlink resource block groups.

16. The apparatus according to claim 15, wherein a ratio of the second uplink predetermined number to the first uplink predetermined number is determined as the first uplink factor, or a ratio of the second downlink predetermined number to the first downlink predetermined number is determined as the first downlink factor, or the first uplink factor is determined according to a ratio of the second uplink predetermined number to the first uplink predetermined number and a correspondence between the ratio and the first uplink factor, or the first downlink factor is determined according to a ratio of the second downlink predetermined number to the first downlink predetermined number and a correspondence between the ratio and the first downlink factor.

17. The apparatus according to claim 15, wherein the number of the second uplink resource blocks indicated by each bit determined by the processor is equal to a product of the first uplink factor and the size of the second uplink resource block group, or the number of the second downlink resource blocks indicated by each bit is equal to a product of the first downlink factor and the size of the second downlink resource block group.

18. The apparatus according to claim 15, wherein the
receiver is further configured to receive second indication information indicating positions of candidate resource block groups in first resource sets or positions of idle resource block groups in the first resource sets; wherein, the second uplink predetermined number of second uplink resource block groups or the second downlink predetermined number of second downlink resource block groups are divided into a third predetermined number of the first resource sets; wherein, resource block groups in each of the first resource sets are consecutive, and each of the first resource sets comprises candidate resource block groups and/or idle resource block groups, positions of the candidate resource block groups being the predetermined positions, and the number of candidate resource blocks of all the first resource sets being equal to the first uplink predetermined number or the first downlink predetermined number;

or configured to receive third indication information indicating a position of an index of a second uplink resource block group or a second downlink resource block group indicated by a first bit of the first indication information.

19. A communication system, comprising a network equipment and a UE, wherein, the network equipment determines first indication information, the first indication information is used to indicate a second uplink resource in a second uplink frequency resource segment used by the UE for transmitting data, or is used to indicate a second downlink resource in a second downlink frequency resource segment used by the network equipment for transmitting data; wherein, the second uplink frequency resource segment comprises a second uplink predetermined number of second uplink resource block groups, and the second downlink frequency resource segment comprises a second downlink predetermined number of second downlink resource block groups;

the network equipment transmits the first indication information to the UE in a first downlink frequency resource segment; wherein, the first downlink frequency resource segment comprises a first downlink predetermined number of first downlink resource block groups, the first downlink predetermined number being unequal to the second downlink predetermined number; or a first uplink frequency resource segment to which the first downlink frequency resource segment corresponds comprises a first uplink predetermined number of first uplink resource block groups, the first uplink predetermined number being unequal to the second uplink predetermined number; and wherein, the first indication information is bitmap information, a bit number of the bitmap information is determined according to the first uplink predetermined number or the first downlink predetermined number;

and the UE receives first indication information in the first downlink frequency resource segment.

* * * * *